United States Patent [19]
Engwall

[11] Patent Number: 5,805,388
[45] Date of Patent: Sep. 8, 1998

[54] SWING TYPE STRUCTURE HAVING AN ELONGATED COLUMN AND WIRES POSITIONED ON OPPOSITE SIDES OF THE COLUMN SUCH THAT THE COLUMN IS IN COMPRESSION AS A RESULT OF THE WIRES

[75] Inventor: Mats Anders Engwall, Hollister, Calif.

[73] Assignee: Western Digital Corporation, Irvine, Calif.

[21] Appl. No.: 22,649

[22] Filed: Feb. 12, 1998

[51] Int. Cl.⁶ .............................. G11B 5/55; G11B 21/08
[52] U.S. Cl. ............................................................ 360/106
[58] Field of Search ..................................... 360/106, 104

[56] References Cited

U.S. PATENT DOCUMENTS

| | | | |
|---|---|---|---|
| 5,165,090 | 11/1992 | Takahashi et al. | 360/106 |
| 5,268,805 | 12/1993 | Peng et al. | 360/106 |
| 5,621,590 | 4/1997 | Pace et al. | 360/106 |

*Primary Examiner*—Robert S. Tupper
*Attorney, Agent, or Firm*—Leo J. Young; W. Chris Kim; Milad G. Shara

[57] ABSTRACT

A swing type structure for a head stack assembly of a disk drive includes a body portion, a coil portion, and at least one actuator arm structure. The actuator arm structure includes at least one elongated column, and a pair of wires in tension. The body portion has a bore defining a longitudinal axis, and the coil portion is cantilevered from the body portion. The elongated column is cantilevered from the body portion in an opposite direction from the coil portion and has a distal end. Each wire is positioned on an opposite side of the elongated column and converges on the distal end such that the elongated column is in compression as a result of the pair of wires.

37 Claims, 4 Drawing Sheets

SWING TYPE STRUCTURE HAVING AN ELONGATED COLUMN AND WIRES POSITIONED ON OPPOSITE SIDES OF THE COLUMN SUCH THAT THE COLUMN IS IN COMPRESSION AS A RESULT OF THE WIRES

CROSS-REFERENCES TO RELATED APPLICATIONS

This application is related to a co-pending U.S. patent application, Ser. No. 08/794,133 filed on Feb. 3, 1997.

BACKGROUND OF THE INVENTION

1. Field of the Invention

This invention relates to disk drives. More particularly, this invention relates to a swing type structure for a head stack assembly of a disk drive.

2. Description of the Prior Art and Related Information

A disk drive such as a hard disk drive typically includes a head disk assembly and a printed circuit board assembly. The head disk assembly includes an enclosure including a base and a cover, at least one disk having at least one recording surface, a spindle motor for causing each disk to rotate, and an actuator arrangement. The printed circuit board assembly includes circuitry for processing signals and controlling operations of the drive.

The actuator arrangement includes a separate transducer for each recording surface, and includes movable structure for supporting each transducer in any of various positions relative to tracks defined on the recording surfaces. Actuator arrangements can be characterized as either linear actuators or rotary actuators; substantially all contemporary, cost-competitive small form factor drives employ a rotary actuator.

A rotary actuator in a head disk assembly typically includes a permanent magnet arrangement forming part of a voice coil motor, a head stack assembly including a swing type structure and plurality of head gimbal assemblies, and a pivot bearing cartridge having a shaft attached to the enclosure to define an axis of rotation for the rotary actuator. Each head gimbal assembly typically includes a load beam, a gimbal, and a head which is interchangeably referred to herein as a slider.

The swing type structure includes a body having a bore for receiving the pivot bearing cartridge, a coil-carrying portion and a plurality of actuator arms. Typically, the actuator arms are made from metal. While metal actuator arms have certain advantages such as providing good grounding of the arms, they have a relatively high mass. Accordingly, the swing type structure also has relatively high mass and high moment of inertia which results in high seek times for the rotary actuator and high power consumption by the voice coil motor to rotate the actuator. Furthermore, the high mass and high moment of inertia of the swing type structure generates relatively large reactive forces on the body of the swing type structure during a track seek operation. Such reactive forces are transferred to the pivot bearing cartridge which leads to relatively high acoustic noise in the disk drive.

Accordingly, what is needed is a swing type structure having lower mass and lower moment of inertia.

SUMMARY OF THE INVENTION

This invention can be regarded as a swing type structure for a head stack assembly of a disk drive which includes a body portion, a coil portion, and an actuator arm structure. The actuator arm structure includes an elongated column, and a pair of wires in tension. The body portion has a bore defining a longitudinal axis, and the coil portion is cantilevered from the body portion. The elongated column is cantilevered from the body portion in an opposite direction from the coil portion and has a distal end. Each wire is positioned on an opposite side of the elongated column and converges on the distal end such that the elongated column is in compression as a result of the pair of wires.

This invention can also be regarded as a head stack assembly for a disk drive which includes a swing type structure. The swing type structure includes a body portion, a coil portion, and an actuator arm structure. The actuator arm structure includes an elongated column, and a pair of wires in tension. The body portion has a bore defining a longitudinal axis, and the coil portion is cantilevered from the body portion. The elongated column is cantilevered from the body portion in an opposite direction from the coil portion and has a distal end. Each wire is positioned on an opposite side of the elongated column and converges on the distal end such that the elongated column is in compression as a result of the pair of wires.

This invention can also be regarded as a disk drive including an enclosure, a spindle motor, a disk, a head stack assembly, and a pivot bearing cartridge. The enclosure includes a base, and the spindle motor is attached to the base; the disk is mounted on the spindle motor. The head stack assembly includes a swing type structure. The swing type structure includes a body portion, a coil portion, and an actuator arm structure. The actuator arm structure includes an elongated column, and a pair of wires in tension. The body portion has a bore defining a longitudinal axis, and the coil portion is cantilevered from the body portion. The elongated column is cantilevered from the body portion in an opposite direction from the coil portion and has a distal end. Each wire is positioned on an opposite side of the elongated column and converges on the distal end such that the elongated column is in compression as a result of the pair of wires. The pivot bearing cartridge has a shaft which includes an attachment portion for attaching the shaft to the base. The bore surrounds the pivot bearing cartridge.

Preferably, the elongated column is tubular and has a cross section which is uniform along the entire length of the column. Furthermore, the pair of wires and the column are preferably made from carbon fibers.

DETAILED DESCRIPTION OF THE PREFERRED EMBODIMENTS

Figure 1:
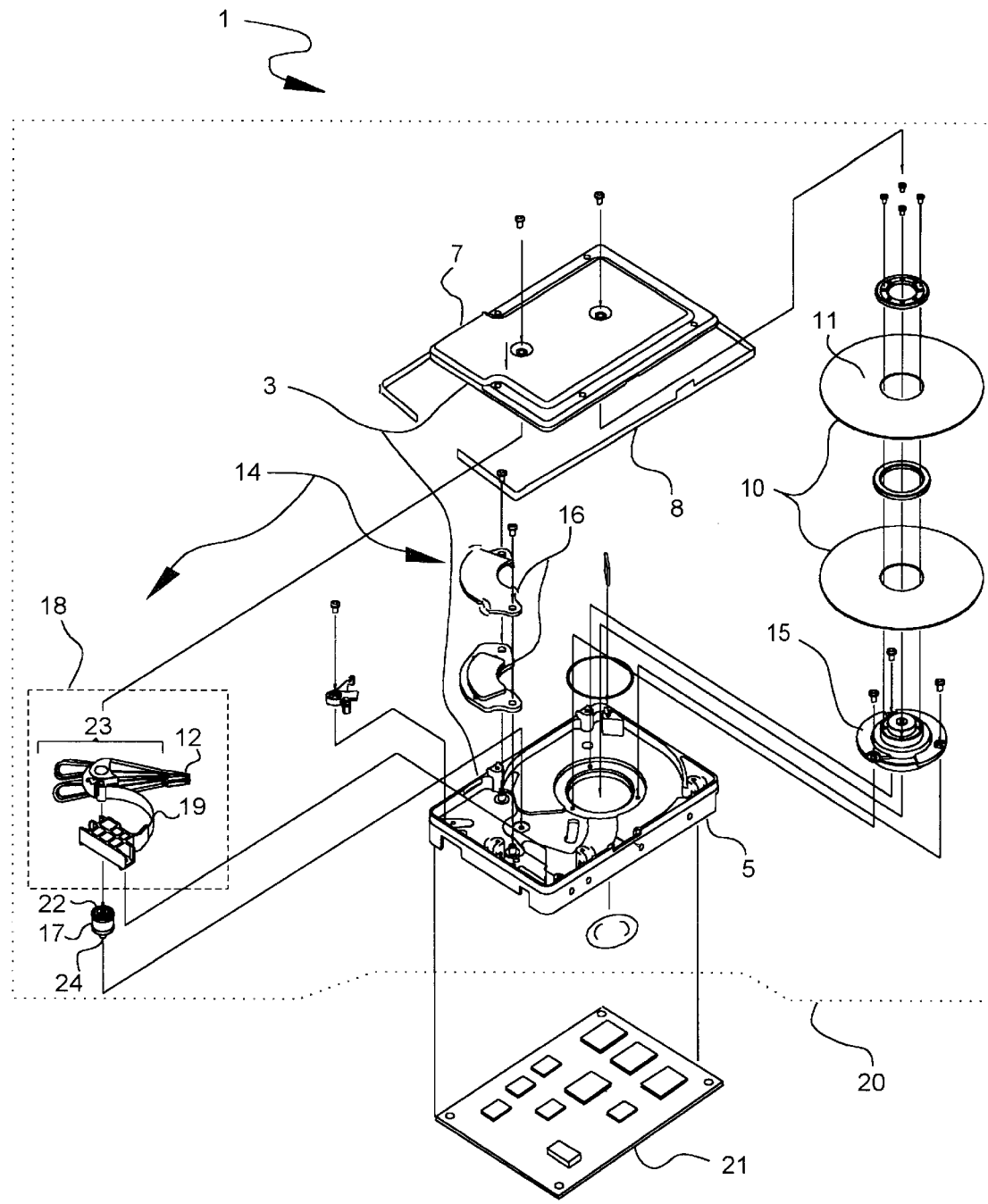
FIG. 1 is an exploded view of a hard disk drive incorporating an embodiment of this invention.

With reference to FIG. 1, a disk drive such as a hard disk drive 1 embodying this invention includes an enclosure 3 including a base 5 and a cover 7. Enclosure 3 is sealed to provide a relatively contaminant-free interior for a head disk assembly (HDA) portion 20 of hard disk drive 1. Suitably, a tape seal 8 is used to seal enclosure 3. Hard disk drive 1 also includes a printed circuit board assembly 21 which contains the circuitry for processing signals and controlling operations of the hard disk drive.

Within its interior, hard disk drive 1 includes a magnetic disk 10 having a recording surface 11, and includes a head gimbal assembly 12 which includes a load beam, gimbal, and a head having a magnetic transducer. The particular embodiment shown in FIG. 1 includes two disks 10, providing four recording surfaces, and includes four magnetic transducers. Hard disk drive 1 further includes a rotary actuator arrangement generally indicated at 14. A spindle motor 15 attached to base 5 causes each disk 10 mounted on the spindle motor to spin, preferably at a constant angular velocity.

Rotary actuator arrangement 14 provides for positioning a magnetic transducer over a selected area, such as a selected track, of recording surface 11 of disk 10. Rotary actuator arrangement 14 includes a permanent-magnet arrangement generally indicated at 16, a pivot bearing cartridge 17 and a head stack assembly 18. Pivot bearing cartridge 17 includes a stationary shaft 22 having an attachment portion 24 secured to base 5 to define an axis of rotation for rotary actuator arrangement 14; pivot bearing cartridge 17 is installed in a bore of head stack assembly 18 such that the bore surrounds the pivot bearing cartridge. Head stack assembly 18 includes a swing type structure 23 and a flex circuit cable assembly 19.

Figure 2A:
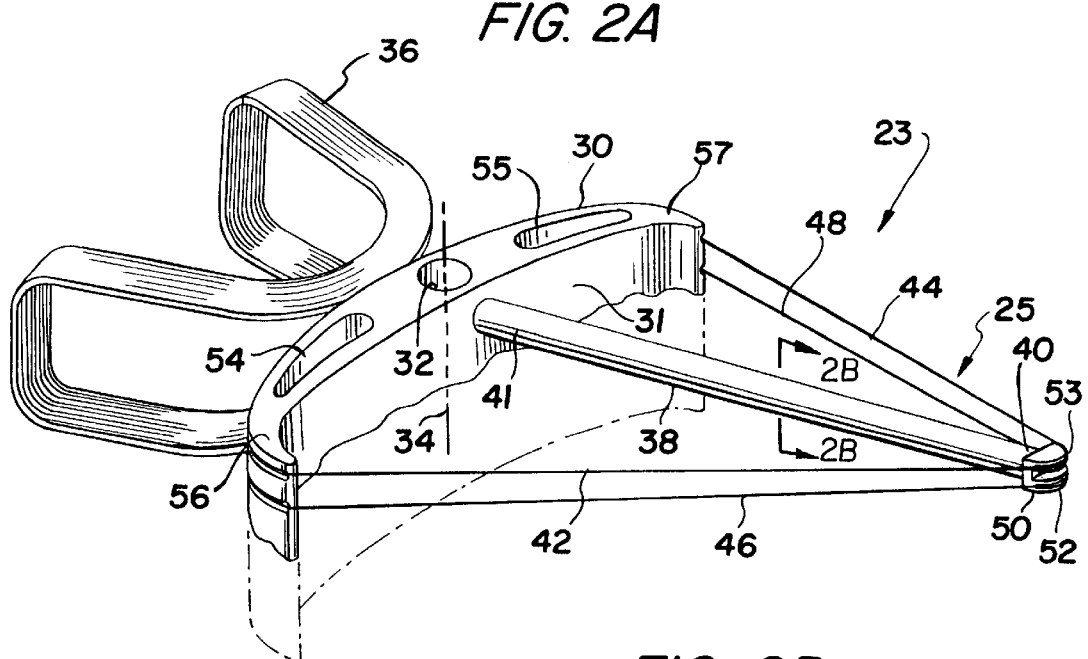
FIG. 2A is a perspective view of the swing type structure shown in FIG. 1 in which only a single elongated column ("actuator arm") is shown.

With reference to FIG. 2A, a preferred embodiment of a portion of swing type structure 23 shown in FIG. 1 includes a body portion 30, a coil portion 36, and an actuator arm structure generally indicated at 25. Actuator arm structure 25 includes an elongated column 38 (referred to herein as an "actuator arm"), a pair of wires 42 and 44, another pair of wires 46 and 48, and a saddle 50. Body portion 30 includes a front surface 31 and a bore 32 which defines a longitudinal axis 34. Pivot bearing cartridge 17 (FIG. 1) is installed in bore 32 to allow swing type structure 23 to rotate relative to longitudinal axis 34. Coil portion 36 is cantilevered from body portion 30. The details of coil portion 36 are disclosed in the above referenced co-pending U.S. patent application, Ser. No. 08/794,133, filed on Feb. 3, 1997 which is incorporated by reference herein. The particular structure of coil portion 36 further reduces the mass of swing type structure 23 compared to the coil portion shown in FIG. 2C.

Figure 2B:
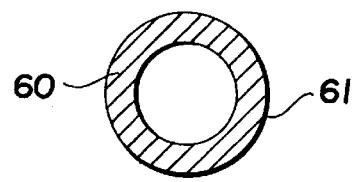
FIG. 2B is a cross section view of the actuator arm shown in FIG. 2A.

Elongated column 38 is cantilevered from body portion 30 in an opposite direction from coil portion 36 and includes a proximal end 41 and a distal end 40. Elongated column 38 may be made from a high modulus, high strength material. Preferably, the material is carbon fibers, metal or plastic. As shown in FIGS. 2A and 2B, elongated column 38 has a circular cross section which is uniform along the entire length of elongated column 38. However, the cross section does not have to be uniform along the entire length of the elongated column, and other types of cross sections may be used such as an elliptical cross section. Also, elongated column 38 may be entirely solid; however, elongated column 38 is preferably tubular to further reduce the mass of the swing type structure. As shown in FIG. 2B, elongated column 38 includes a circular cross section 61. Cross section 61 includes an annular surface 60.

Continuing with FIG. 2A, the pair of wires 42 and 44 are in tension and each wire is positioned on an opposite side of elongated column 38 and converges on distal end 40 such that elongated column 38 is in compression as a result of pair of wires 42 and 44. Body portion 30 includes a plurality of slots 54 and 55. Another pair of wires 46 and 48 are also in tension and each wire is positioned on an opposite side of elongated column 38 and converges on distal end 40 such that elongated column 38 is in compression as a result of the another pair of wires 46 and 48. Preferably, both pairs of wires are part of a single wire forming a continuous loop around body portion 30 and elongated column 38, the details of which will be described below relative to FIG. 5.

As shown in FIG. 2A, the another pair of wires 46 and 48 are spaced apart longitudinally from the pair of wires 42 and 44. Preferably, wires 42 and 46 converge as they approach distal end 40 such that the wires are not parallel along the distance from body portion 30 to saddle 50. However, wires 42 and 46 may be parallel according to another embodiment of this invention. The wires may be made from a suitable high modulus, high strength material; preferably the wires are made from carbon fibers. Saddle 50 is positioned at distal end 40 and includes a pair of grooves 52 and 53. Each groove provides a path for a respective pair of wires such as wires 42 and 44 to converge at distal end 40. Significantly, each groove also provides for securely positioning each respective wire to the saddle 50 to prevent longitudinal movement of the wires relative to the saddle. Saddle 50 may be attached to elongated column 38 using any suitable means such as using adhesive to attach the two components. While, saddle 50 is preferably used to guide the wires around distal end 40, the grooves may be formed directly on distal end 40 eliminating the need for the saddle. Slots 54 and 55 are positioned on body portion 30 such that each slot is between bore 32 and a respective end of body portion 30. The slots may be either entirely cut through body portion 30 in the longitudinal direction or may be partially cut through body portion 30. Such slots are used to further reduce the mass of the swing type structure. As shown in FIG. 2A, body portion 30 is elongated and curves inward towards distal end 40 as evidenced by end portions 56 57.

Figure 2C:
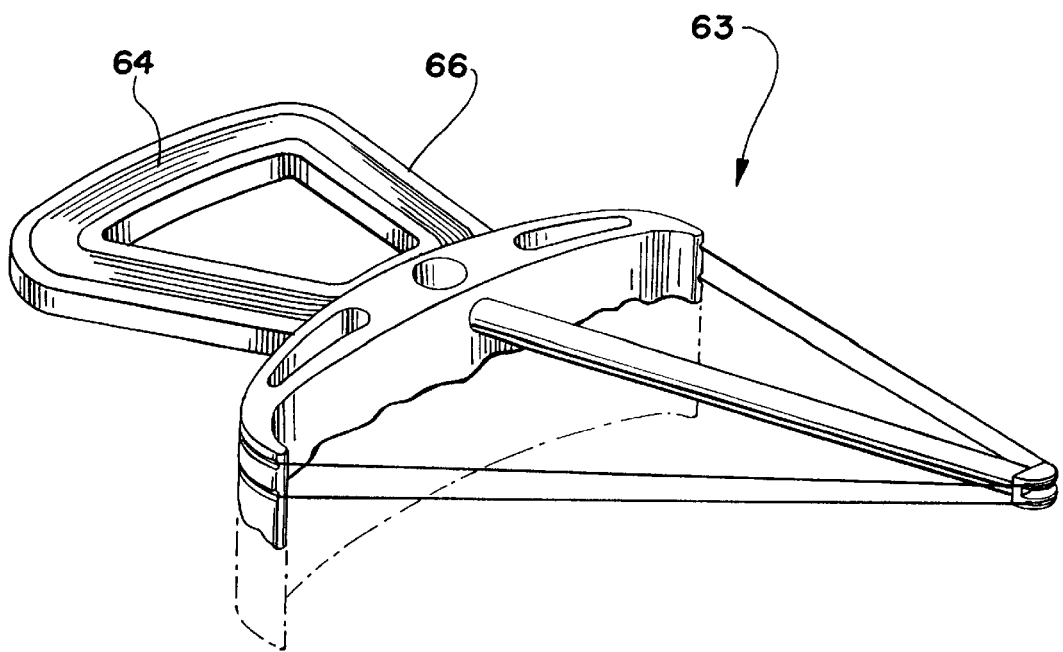
FIG. 2C is a perspective view of a swing type structure according to another embodiment of this invention.

With reference to FIG. 2C, a swing type structure 63 according to another embodiment of this invention is shown. The only difference between FIG. 2C and FIG. 2A is that a different coil portion 66 is used in the embodiment shown in FIG. 2C. Coil portion includes a coil 64 encapsulated in a plastic overmold. However, the embodiment shown in FIG. 2A is preferred because of the lower mass and inertia as a result of the particular structure of its coil portion.

Figure 3:
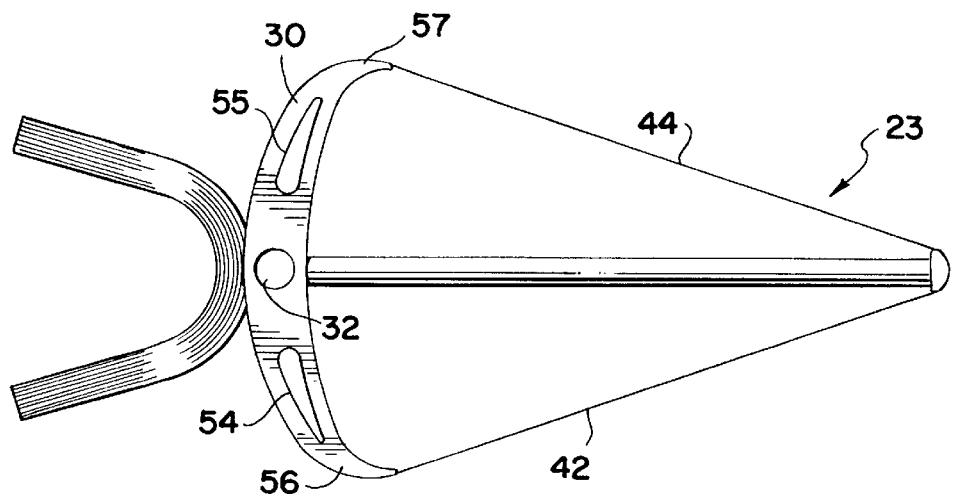
FIG. 3 is a plan view of the swing type structure shown in FIG. 2A.

With reference to FIG. 3, swing type structure 23 includes body portion 30 which is elongated in an arcuate direction substantially perpendicular to the longitudinal axis (FIG. 2A) of bore 32. FIG. 3 more clearly shows that body portion 30 is curved inward towards the distal end of the elongated arm as again evidenced by end portions 56 and 57. Furthermore, each pair of wires such as 42 and 44 is symmetrically positioned relative to elongated column 38.

Continuing with FIG. 3, slots 54 and 55 provide a spring function to the body portion as well as reducing its mass when the body portion is curved inward as shown. The spring function is dependent on the geometry and position of each slot. For example, the longer the slot and the closer it is positioned to an end portion of body portion 30, the greater the spring function. When the body portion and suitable number of elongated columns with a saddle attached (collectively referred to herein as an "actuator assembly") are placed in a fixture for winding a wire, the end portions of body portion 30 are flexed inward and held in this position until the winding is completed. After the winding is completed, to be described in further detail below, the actuator assembly is taken out of the fixture, at which point the body portion's ability to flex back to its original position is limited by the tension on the wire. Preferably, the body portion flexes back to some extent such that the final tension on the wire is greater than the tension achieved during the winding process.

In another embodiment, the front surface of the body portion may be flat. In both embodiments, the curvature of the back surface allows the wire to sufficiently contact the back surface such that a uniform tension exists on the wire relative to the back surface.

Figure 4:
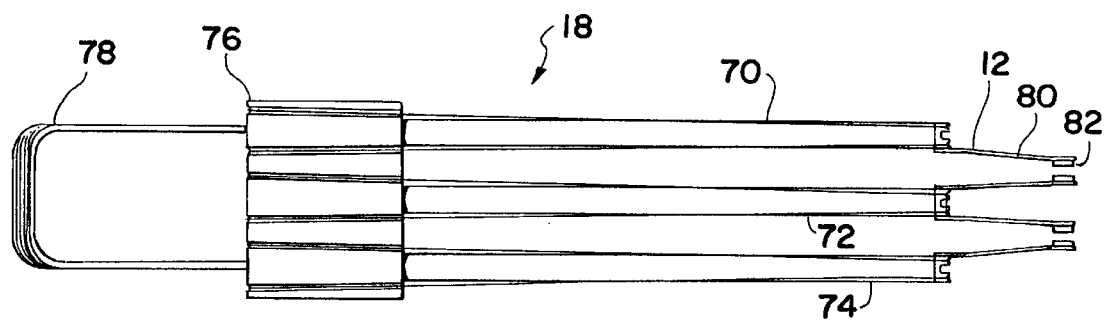
FIG. 4 is a side view of a portion of the head stack assembly shown in FIG. 1.

With reference to FIG. 4, a side view of head stack assembly 18 (FIG. 1) is shown. Head stack assembly includes a plurality of actuator arm structures, each including respective elongated columns 70, 72, and 74. Each column is cantilevered from a body portion 76 in an opposite direction from a coil portion 78. While three elongated columns 70, 72, and 74 are shown which correspond to three actuator arms, any suitable number of elongated columns can be used such as two, four, or five elongated columns. A head gimbal assembly 12 is attached to the distal end of an elongated column. Head gimbal assembly includes a load beam 80, a gimbal (not shown) attached to the distal end of the load beam 80 and a slider 82 attached to the gimbal. Suitably, load beam 80 may be attached to an elongated column via its saddle by staking, crimping, swaging, or using an adhesive. A flex circuit cable assembly such as the one shown in FIG. 1 may be attached to body portion 76 by suitable means such as using screws or an adhesive.

Figure 5:
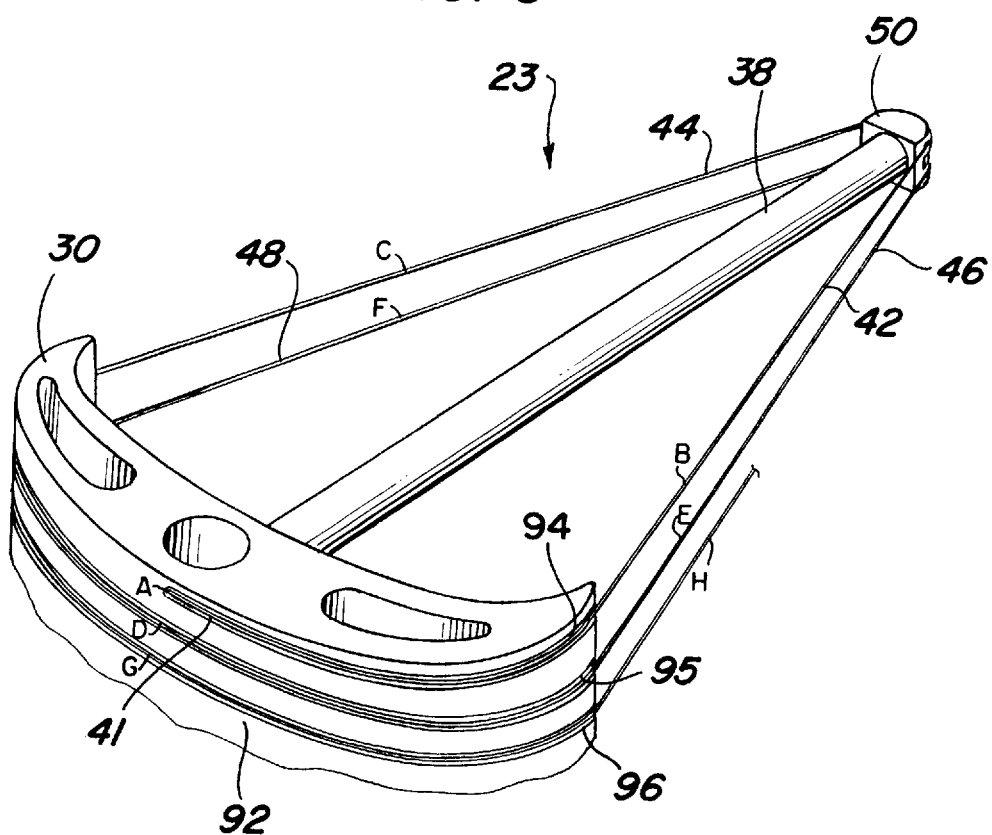
FIG. 5 is a perspective view of a portion of the swing type structure shown in FIG. 1 showing a preferred method of winding the wires such that an actuator arm is in compression as a result of the wires.

With reference to FIG. 5, a preferred method of winding the wires is shown such that elongated column 38 is in compression. Prior to the winding process, body portion 30 and elongated columns 38, only one of which is shown in FIG. 5, may be formed as a unitary component by an injection molding process. Alternatively, body portion 30 and each elongated column may be made separately and then each column can be attached to the body portion via a corresponding hole (not shown) in front surface 31 (FIG. 2A). Each corresponding hole provides a convenient means of accurately positioning each column relative to the body portion and to each other. Each column may be securely positioned in each hole by using an adhesive. Saddle 50 may then be attached to the distal end of each elongated column 38. The actuator assembly is next placed in a suitable fixture to wind the wires. Suitably, the winding is done by a machine.

Continuing with FIG. 5, body portion 30 includes a back surface 92 and a plurality of grooves 94–96. Preferably, grooves 95 and 96 slope downward along back surface 92. Of course, the number of grooves is dependent on the number of elongated columns. In the preferred embodiment, a single wire 41 is used to form a continuous loop and letters A–H represent sequential steps in winding the wire by the machine. Each groove provides for securely positioning wire 41 such that after the winding is completed, the movement of the wire longitudinally relative to back surface 92 is minimized. The continuous loop is formed by starting at step A on back surface 92. Wire 41 is attached to back surface 92 at step A by suitable means such as gluing, crimping, clamping, or laser welding the wire to the back surface. Wire 41 is wrapped around body portion 30 via groove 94 and is then wrapped around saddle 50. Wire 41 is then wrapped around body portion 30 via groove 95 such that step D is reached. The wire continues around body portion 30 via step E, wrapped around saddle 50, and then wrapped around body portion via groove 96 to reach step G. Additional elongated columns can be put in compression by continuing with the winding process as indicated by step H. After the winding process is finished, a coil portion may be attached to the body portion by using suitable means such as overmolding, staking, or using glue to attach the two components together. Preferably, the tension of the wire is approximately 1 to 10N.

Figure 6:
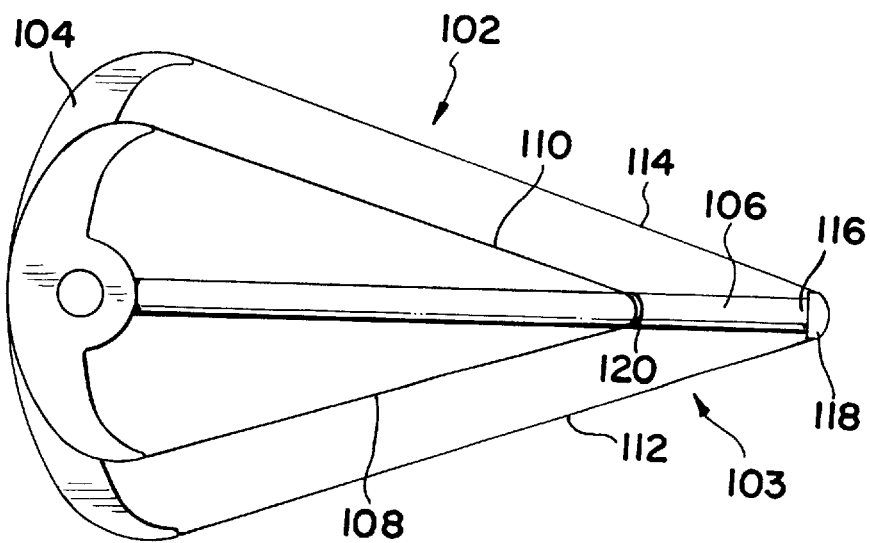
FIG. 6 is a plan view of a portion of a swing type structure according to another embodiment of this invention.

With reference to FIG. 6, a swing type structure 102 according to another embodiment is shown which includes a body portion 104 and an actuator arm structure generally indicated at 103. Actuator arm structure 103 includes an elongated column 106 having a distal end 116, a pair of wires 112 and 114, another pair of wires 108 and 110, and a saddle 118 attached to distal end 116. Body portion 104 includes a back surface which includes a plurality of grooves (not shown) for securely positioning portions of a single wire which is preferably used to form a continuous loop when the swing type structure is being assembled. The pair of wires 112 and 114 are in tension and each is positioned on an opposite side of elongated column 106 and converges at distal end 116. Another pair of wires 108 and 110 are also in tension and each is positioned on an opposite side of elongated column 106 and converges at a location indicated by 120. Location 120 is between the body portion and the distal end. Location 120 includes a groove for securely positioning the wire. Elongated column 106 is in compression as a result of the pairs of wires. Both pairs of wires are symmetrically positioned relative to the elongated column and wire 112 is substantially parallel to wire 108 as are wires 114 and 110.

An advantage of this invention is a head stack assembly including a swing type structure having lower mass and moment of inertia. Such a reduction in mass and moment of inertia decreases the seek time of the rotary actuator and allows the use of smaller components such as smaller permanent magnets and coil. The use of such smaller components reduces the cost of the components. In addition, reactive forces on the body portion are reduced which decreases the acoustic noise in the disk drive during operations such as a track seek operation and power consumption of a voice coil motor is lowered because of the lower mass of the swing type structure according to this invention.

I claim:

1. A swing type structure for a head stack assembly of a disk drive, the swing type structure comprising:

a body portion having a bore defining a longitudinal axis;

a coil portion cantilevered from the body portion; and an actuator arm structure, the actuator arm structure comprising:

an elongated column cantilevered from the body portion in an opposite direction from the coil portion and having a distal end; and a pair of wires in tension, each wire positioned on an opposite side of the elongated column and converging on the distal end such that the elongated column is in compression as a result of the pair of wires.

2. The swing type structure of claim 1 further comprising:

a plurality of actuator arm structures.

3. The swing type structure of claim 1 further comprising:

another pair of wires in tension, each wire positioned on an opposite side of the elongated column and converging on the distal end such that the elongated column is in compression as a result of the another pair of wires.

4. The swing type structure of claim 3 wherein the another pair of wires is spaced apart longitudinally from the pair of wires.

5. The swing type structure of claim 1 wherein the actuator arm structure further comprises:

a saddle positioned at the distal end and having a groove for providing a path for the pair of wires to converge at the distal end.

6. The swing type structure of claim 1 wherein the elongated column is tubular.

7. The swing type structure of claim 6 wherein a cross section of the elongated column is uniform along an entire length of the elongated column.

8. The swing type structure of claim 7 wherein the uniform cross section defines an annular surface.

9. The swing type structure of claim 7 wherein the elongated column is made from carbon fibers, metal, or plastic.

10. The swing type structure of claim 1 wherein the pair of wires is made from carbon fibers.

11. The swing type structure of claim 1 wherein the body portion is elongated in a direction substantially perpendicular to the longitudinal axis.

12. The swing type structure of claim 11 wherein the body portion further comprises:

a plurality of slots, each slot positioned between the bore and a respective end of the body portion.

13. The swing type structure of claim 11 wherein the elongated body portion is curved inward towards the distal end of the elongated column.

14. The swing type structure of claim 1 wherein the body portion further comprises:

a back surface, the back surface comprising:
a plurality of grooves.

15. The swing type structure of claim 1 further comprising:

another pair of wires in tension, each wire positioned on an opposite side of the elongated column and converging at a location on the elongated column between the body portion and the distal end such that the elongated column is in compression as a result of the another pair of wires.

16. A head stack assembly for a disk drive, the head stack assembly comprising:

a swing type structure, the swing type structure comprising:
a body portion having a bore defining a longitudinal axis;
a coil portion cantilevered from the body portion; and
an actuator arm structure, the actuator arm structure comprising:
an elongated column cantilevered from the body portion in an opposite direction from the coil portion and having a distal end; and
a pair of wires in tension, each wire positioned on an opposite side of the elongated column and converging on the distal end such that the elongated column is in compression as a result of the pair of wires.

17. The head stack assembly of claim 16 wherein the swing type structure further comprises:

a plurality of actuator arm structures.

18. The head stack assembly of claim 16 wherein the swing type structure further comprises:

another pair of wires in tension, each wire positioned on an opposite side of the elongated column and converging on the distal end such that the elongated column is in compression as a result of the another pair of wires.

19. The head stack assembly of claim 16 wherein the actuator arm structure further comprises:

a saddle positioned at the distal end and having a groove for providing a path for the pair of wires to converge at the distal end of the elongated column.

20. The head stack assembly of claim 16 wherein the elongated column is tubular.

21. The head stack assembly of claim 20 wherein a cross section of the elongated column is uniform along an entire length of the elongated column.

22. The head stack assembly of claim 21 wherein the elongated column is made from carbon fibers, metal, or plastic.

23. The head stack assembly of claim 16 wherein the pair of wires is made from carbon fibers.

24. The head stack assembly of claim 16 wherein the body portion is elongated in a direction substantially perpendicular to the longitudinal axis.

25. The head stack assembly of claim 24 wherein the elongated body portion is curved inward towards the distal end of the elongated column.

26. The head stack assembly of claim 16 wherein the body portion further comprises:

a back surface, the back surface comprising:
a plurality of grooves.

27. A disk drive comprising:

an enclosure including a base;
a spindle motor attached to the base;
a disk mounted on the spindle motor;
a head stack assembly comprising:
a swing type structure, the swing type structure comprising:
a body portion having a bore defining a longitudinal axis;
a coil portion cantilevered from the body portion; and
an actuator arm structure, the actuator arm structure comprising:
an elongated column cantilevered from the body portion in an opposite direction from the coil portion and having a distal end; and
a pair of wires in tension, each wire positioned on an opposite side of the elongated column and converging on the distal end such that the elongated column is in compression as a result of the pair of wires; and
a pivot bearing cartridge having a shaft, the shaft having an attachment portion for attaching the shaft to the base, the bore surrounding the pivot bearing cartridge.

28. The disk drive of claim 27 wherein the swing type structure further comprises:

a plurality of actuator arm structures.

29. The disk drive of claim 27 wherein the swing type structure further comprises:

another pair of wires in tension, each wire positioned on an opposite side of the elongated column and converging on the distal end such that the elongated column is in compression as a result of the another pair of wires.

30. The disk drive of claim 27 wherein the actuator arm structure further comprises:

a saddle positioned at the distal end and having a groove for providing a path for the pair of wires to converge at the distal end of the elongated column.

31. The disk drive of claim 27 wherein the elongated column is tubular.

32. The disk drive of claim 31 wherein a cross section of the elongated column is uniform along an entire length of the elongated column.

33. The disk drive of claim 32 wherein the elongated column is made from carbon fibers, metal, or plastic.

34. The disk drive of claim 27 wherein the pair of wires is made from carbon fibers.

35. The disk drive of claim 27 wherein the body portion is elongated in a direction substantially perpendicular to the longitudinal axis.

36. The disk drive of claim 35 wherein the elongated body portion is curved inward towards the distal end of the elongated column.

37. The disk drive of claim 27 wherein the body portion further comprises:
    a back surface, the back surface comprising:
        a plurality of grooves.

* * * * *